United States Patent [19]

Scott

[11] Patent Number: 5,752,199
[45] Date of Patent: May 12, 1998

[54] METHOD AND APPARATUS FOR SENDING FAXES OVER ANALOG CELLULAR

[75] Inventor: Robert Earl Scott, Indian Rocks Beach, Fla.

[73] Assignee: Paradyne Corporation, Largo, Fla.

[21] Appl. No.: 573,739

[22] Filed: Dec. 18, 1995

[51] Int. Cl.⁶ .................................................... H04Q 7/22
[52] U.S. Cl. .......................... 455/557; 455/422; 375/222; 379/100.13
[58] Field of Search .................... 379/58, 59, 93, 379/97, 98, 100, 53.01, 93.28, 93.31, 100.01, 100.15, 100.16, 100.13, 93.14; 455/33.1, 550, 556, 557, 422; 375/222

[56] References Cited

U.S. PATENT DOCUMENTS

| | | | |
|---|---|---|---|
| 4,476,496 | 10/1984 | Thaler | 358/286 |
| 4,837,800 | 6/1989 | Freeburg et al. | 379/59 |
| 4,878,228 | 10/1989 | Takahashi | 375/3 |
| 5,021,890 | 6/1991 | Yoshida et al. | 358/405 |
| 5,123,033 | 6/1992 | Beck | 375/121 |
| 5,175,762 | 12/1992 | Kochis et al. | 379/100.15 |
| 5,237,429 | 8/1993 | Zuiss et al. | 358/442 |
| 5,243,438 | 9/1993 | Anderson et al. | 358/426 |
| 5,263,078 | 11/1993 | Takahashi et al. | 379/58 |
| 5,268,928 | 12/1993 | Herh et al. | 375/222 |
| 5,282,238 | 1/1994 | Berland | 379/58 |
| 5,359,648 | 10/1994 | Dunn et al. | 379/93.31 |
| 5,369,501 | 11/1994 | Wilson et al. | 358/407 |
| 5,450,472 | 9/1995 | Brax | 455/557 |
| 5,487,175 | 1/1996 | Bayley et al. | 379/59 X |
| 5,535,242 | 7/1996 | Brigida et al. | 375/222 |
| 5,559,800 | 9/1996 | Mousseau et al. | 455/33.1 X |

OTHER PUBLICATIONS

U.S. Patent Application by Gordon Bremer, entitled "Conversion Of A Fax Modulation To A Data Modulation," Serial No. 08/151689, Filed on Nov. 15, 1993.

*Primary Examiner*—Dwayne D. Bost
*Assistant Examiner*—William G. Trost
*Attorney, Agent, or Firm*—Thomas, Kayden, Horstemeyer & Risley

[57] ABSTRACT

A cellular modem is configured in one of two modes of fax operation: a standard fax mode or an extended fax mode. In the standard fax mode, the cellular modem completes calls as in the prior art. In the extended fax mode, fax information is transmitted over a cellular-portion of the cellular fax call using a "2-D" fax compression scheme and a data modulation as specified in AT&T Paradyne's "Enhanced Throughput Cellular (ETC) Protocol". In this mode of operation, "AT-commands" related to establishing the fax connection are transmitted from the cellular modem to a Mobile Switching Center (MSC) that includes a cellular modem pool. This allows fax-capable terminal equipment at the mobile end of the connection to communicate directly with a far-end fax-capable modem in the MSC notwithstanding the presence of an analog modem at the mobile end.

9 Claims, 4 Drawing Sheets

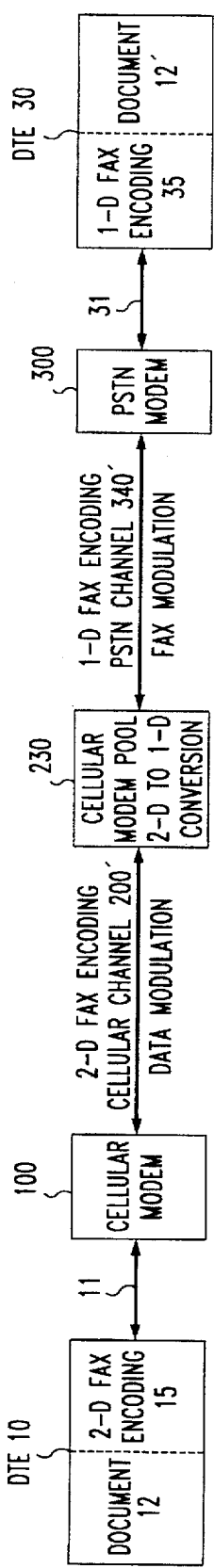
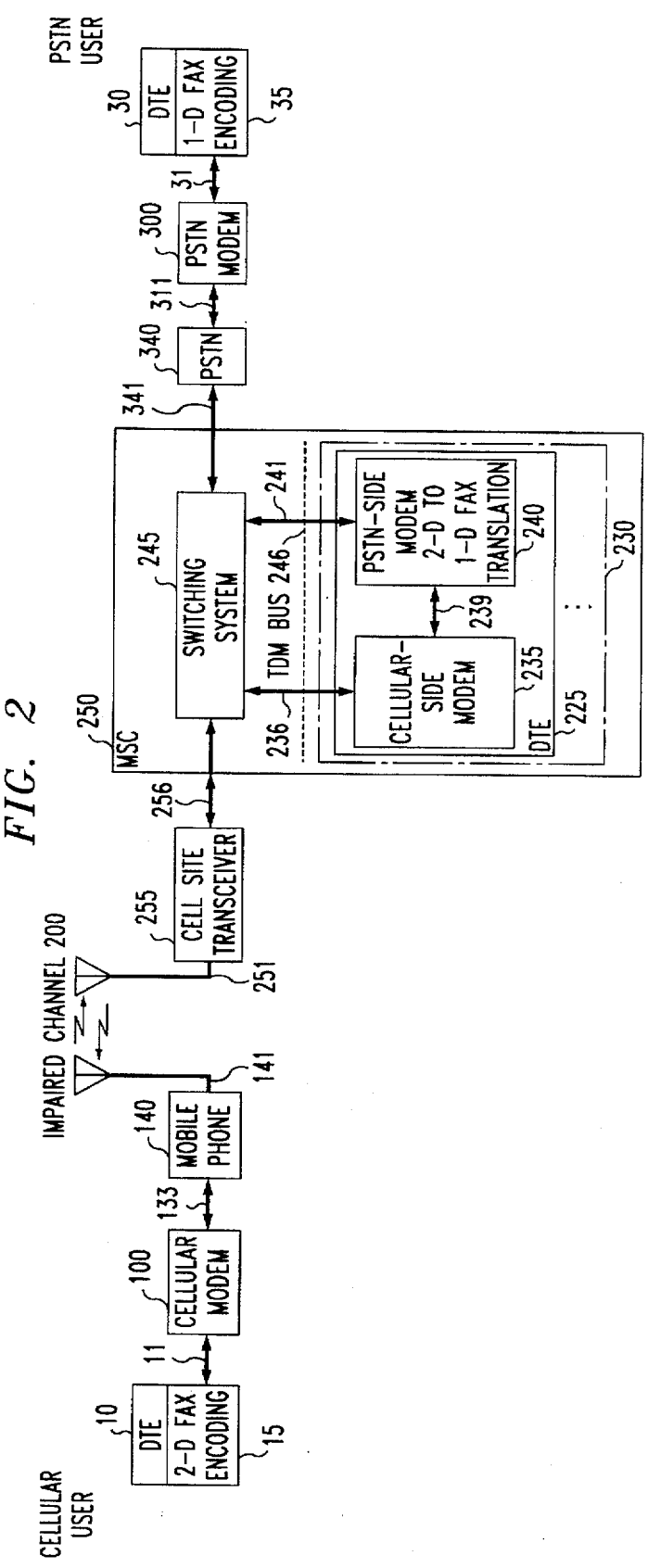

METHOD AND APPARATUS FOR SENDING FAXES OVER ANALOG CELLULAR

CROSS-REFERENCE TO RELATED APPLICATIONS

Related subject matter is disclosed in the co-pending commonly assigned, U.S. Patent application of Scott, entitled "The Use of Compression to Improve the Sending of Faxes over Analog Cellular," Ser. No. 08/573,700, filed on Dec. 18, 1995; and Patel et al., entitled "An Improved Method For Sending Faxes over Wireless Communications Channels," Ser. No. 08/573,702, filed on Dec. 18, 1995.

BACKGROUND OF THE INVENTION

The present invention relates to facsimile communications over wireless links, and, more particularly, to facsimile (fax) communications over an analog cellular communications channel.

Today, the North American cellular system is predominately an analog system sometimes referred to as AMPS (Advanced Mobile Phone Service). Although fax communications can take place over an AMPS cellular communications channel, there are some "idiosyncrasies" of fax commnunications over an AMPS cellular channel that affect the reliability of a fax/cellular connection (hereafter referred to as cellular fax). For instance, a fax receiver provides "delayed feedback" on any error detection and correction to a corresponding fax transmitter. This "delayed feedback" is due, in part, to the fact that fax handshaking and modulation schemes are "half-duplex," and also because of fax error correcting requirements like the "Error Correction Mode" (ECM) as defined in International Telecommunication Union (ITU) fax standards like T.4 (fax encoding standard) and T.30 (fax handshaking procedures). In ECM, transmission of error information from a fax receiver to the corresponding fax transmitter is delayed until after 255 frames of fax information are received. Unfortunately, since there are generally more errors in the cellular communications environment, the effect of this "delayed feedback" is that a cellular fax call generally takes longer to complete than when only land-line connections are involved.

In addition to the above-mentioned "delayed feedback" problem, the cellular fades, and hits, which characterize the impairments of the cellular communications channel, can cause a loss of carrier or a large burst of errors. However, a fax modem, generally speaking, is not tolerant to bad line conditions and will tend to immediately disconnect if the received signal quality is not good. Consequently, cellular fades and hits may cause a fax modem to abruptly disconnect.

As a result of the above, it can be observed that the problems to solve in sending fax over cellular communications channels are: enhance the quality of the received fax, i.e., lower the Bit Error Rate (BER), enhance the reliability of the fax transfer, i.e., reduce the number of abrupt disconnects, and enhance the overall speed, or throughput, of the fax transfer.

One approach to improving cellular fax transmission is the use of digital cellular techniques instead of the analog-based AMPS. In the digital approach, a full-duplex digital communications channel is used for the cellular portion of the cellular fax call. In other words, there is no analog modem at the cellular end. Consequently, there are no corresponding fax handshaking and modulation techniques over the cellular portion of the cellular fax call. In this approach, fax-capable terminal equipment at the mobile end of the cellular fax call transmits fax information in digital form over a full-duplex digital cellular channel to a far-end fax-capable modem in a Mobile Switching Center (MSC). The far-end fax-capable modem then establishes the traditional analog-based fax call over the land-line portion of the cellular fax call. The fax-capable terminal equipment at the mobile end communicates directly with the far-end fax-capable modem in the MSC since there is no analog modem at the cellular end.

SUMMARY OF THE INVENTION

In accordance with the inventive concept, I have realized a way to improve fax transmissions in a cellular analog environment. In particular, a cellular modem enters an extended-mode of operation in which some modem-commands are classified as local or remote. Local commands are operated on by the cellular modem, while remote commands are transmitted to a far-end endpoint. This allows fax-capable terminal equipment at the mobile end of the connection to communicate directly with a far-end fax-capable modem in the MSC notwithstanding the presence of an analog cellular modem at the mobile end.

In an embodiment of the invention, a cellular modem is configured in one of two modes of operation: a data mode or a fax mode. In the data mode, the cellular modem completes all calls as in the prior art. In the fax mode, fax information is transmitted over a cellular-portion of the cellular fax call using a "2-D" fax compression scheme and a data modulation as specified in AT&T Paradyne's "Enhanced Throughput Cellular (ETC) Protocol". In this mode of operation, "AT-commands" related to establishing the fax connection are transmitted from the cellular modem to an MSC that includes a cellular modem pool. The latter comprises a number of pairs of modems in which the data terminal equipment (DTE) ports of each modem pair are cross-connected in a "back-to-back" fashion. This allows the two modems of each pair to interchange data via their DTE ports and thereby isolate that portion of the cellular fax call over the cellular communications channel from that portion of the cellular fax call through the PSTN. The above-mentioned "AT-commands" related to the fax connection operate on the PSTN-side modem.

BRIEF DESCRIPTION OF THE DRAWING

FIG. 1 shows an illustrative high-level block diagram of a cellular communications system embodying the principles of the invention;

FIG. 2 shows a more detailed block diagram of the cellular communications system of FIG. 1;

DETAILED DESCRIPTION

Figure 3:
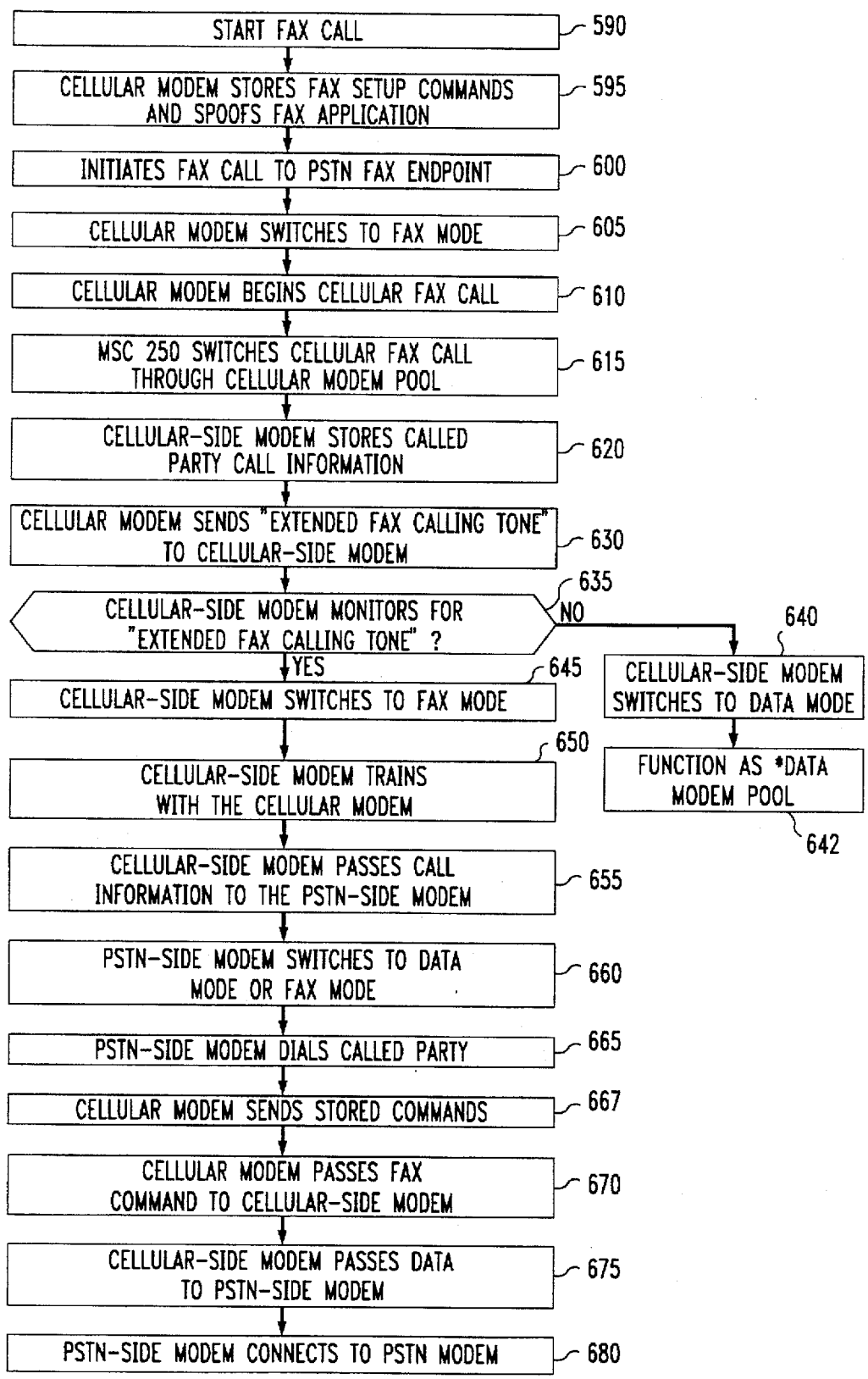
FIG. 3 shows a flow diagram for processing a fax call in accordance with the principles of the invention.

As background, it should be noted that fax transmission is governed by a number of standards. For example, the following standards specify the fax data rate and modulation schemes: ITU V.17 defines half-duplex 14.4 kbps modulation; ITU V.29 defines half-duplex 9.6 kbps modulation; and ITU V.27ter defines half-duplex 4.8 kbps modulation. In addition to the specification of the fax data rate and modulation schemes, ITU T.4 defines the fax image encoding scheme, generally know as Group 3. Most fax equipment or services currently provided are Group 3 faxes. Group 2 and Group 1 fax schemes, as specified by ITU T.3 and T.2, respectively, are much older, slower and simpler. As a result, for the purposes of the following description, Group 3 fax is assumed. Finally, ITU V.21 channel 2 specifies a 300 bps frequency-shift-keying (FSK) modulation used during fax handshaking procedures, which is specified in ITU T.30. The latter defines five phases of a fax call: call establishment, pre-message, message transmission, post message, and call release. Fax handshaking occurs during all phases except the message transmission phase, during which time the Group 3 encoded data is transmitted using one of the above mentioned fax modulation schemes. The function of handshaking, among other things, is to allow each fax endpoint to determine the capabilities of the opposite fax endpoint such as highest supported data rate, page resolution, page size, etc. It should be noted that the ITU T.30 fax handshaking protocol allows for manual operation, where a user can originate or answer a call using a phone connected to the fax device, and then switch to fax mode; and an automatic mode of operation. For the purposes of the examples below, it is assumed that all fax equipment operate in automatic mode.

In addition to the above fax standards, two fax standards define the "class" of fax equipment by specifying the distribution of fax functionality between the DTE and data communications equipment (DCE). Standard EIA/TIA-578 defines Class 1 fax, where the DTE is responsible for providing ITU T.30 and T.4 functionality, while the DCE does the modulation, etc. In comparison, standard EIA/TIA-592 defines Class 2 fax, where the DTE is responsible for ITU T.4 only, while the DCE provides ITU T.30 functionality in addition to the modulation, etc. For the purposes of the following description, fax Class 2 is assumed.

In Group 3 fax, the DTE, which is responsible for ITU T.4 functionality, determines the type of fax encoding, or fax compression, scheme by negotiating with the opposite fax endpoint during the above-mentioned handshaking. One type of fax encoding, or fax compression, is termed "1-D," which compresses one line at a time of an image, or document. Another type of fax compression is termed "2-D," which processes multiple lines of an image, or document. For example, "2-D" fax encoding compresses information on a current line of the document by taking into account what has changed from the previous line of the document. Generally speaking, a 30 to 40% increase in data throughput occurs when using "2-D" fax encoding.

As noted above, a fax DTE negotiates with an opposite fax DTE to determine the type of fax encoding to use. However, I have realized that one can more fully utilize a cellular communications channel during a fax transmission by using a higher-level fax compression scheme over the cellular link independent of the fax compression scheme used over the PSTN communications channel. This type of operation can result in faster transmission of faxes over the cellular communications channel, which in turn results in less cost and higher reliability for the user. Also, and in accordance with the inventive concept, a cellular modem enters an extended-mode of operation in which some modem-commands are classified as local or remote. Local commands are operated on by the cellular modem, while remote commands are stored and later transmitted to a far-end endpoint. This allows fax-capable terminal equipment at the mobile end to communicate directly with a far-end fax-capable modem in the MSC.

An illustrative high-level block diagram of a cellular communications system embodying the principles of the invention is shown in FIG. 1. For the moment, it is assumed that a cellular fax call has already been established between the cellular fax endpoint, as represented by DTE 10 and cellular modem 100, and the PSTN fax endpoint, as represented by DTE 30 and PSTN modem 300. Both fax endpoints conform to class 2 fax. The term "cellular user" is associated with the cellular fax endpoint and the term "PSTN user" is associated with the PSTN fax endpoint. It is assumed that DTE 10 is a personal computer, e.g., a laptop, configured with fax application software 15 that is capable of transmitting or receiving fax information via line 11, which is coupled to cellular modem 100. Similarly, it is assumed for simplicity that DTE 30 is also representative of a personal computer. It should be noted that the combination of a modem and DTE, e.g., PSTN modem 300 and DTE 30, can equivalently represent a fax machine with an integrated modem. The cellular fax call will be described in the context of transmitting fax information, e.g., document 12, from DTE 10 to DTE 30. Although not described herein, the inventive concept also applies to a call originating from a point within the PSTN network to a cellular endpoint.

In this illustrative embodiment, fax application software 15 executing in DTE 10 is independently configured of the opposite fax endpoint to produce a higher-level compression bit map of an image, or document, that is to be transmitted by fax. In particular, fax application software 15 is appropriately modified to always perform "2-D" fax encoding of a fax document, or image, as represented by document 12, independent of the encoding of the opposite fax endpoint. This can accomplished, for example, by providing a configuration option in fax application software 15 to either negotiate the fax encoding (as performed in the prior art) or to simply specify the type of fax encoding. In this context, it is assumed that fax application software 15 is configured to only perform encoded fax signal representing "2-D" fax encoding to cellular modem 100 via line 11. The latter represents the signaling, electronics, and wiring, for conforming to a DTE/DCE interface standard like EIA RS-232. However, it should be realized that even though fax application software 15 is configured to only use "2-D" fax encoding, fax application software 15 still negotiates the fax connection with the opposite fax endpoint as in the prior art—it simply ignores the negotiated fax encoding.

Cellular modem 100 transmits the "2-D" fax encoded signal according to a standard data modulation—not a fax modulation—over cellular channel 200', which is described further below and is representative of the mobile transceiver, cellular channel, cell site transceiver, etc. The data modulation is, illustratively, the "Enhanced Throughput Cellular" (ETC) protocol, available from AT&T Paradyne. The ETC protocol is a cellular-oriented protocol that is better suited to combating the effects of the cellular environment and provides full-duplex data communications over the cellular channel.

Cellular modem pool 230 receives the "2-D" fax encoded signal. Cellular modem pool 230 comprises a number of pairs of back-to-back modems (described below). The use of cellular modem pool 230 allows the cellular-side of the cellular fax call to communicate data using the above-mentioned ETC protocol and the PSTN-side of the cellular fax call to use a traditional fax protocol like ITU V.17. Cellular modem pool 230 performs a "2-D" to "1-D" conversion to transmit a "1-D" fax encoded signal using a standard fax modulation over PSTN channel 340' (described below) to PSTN modem 300. The latter recovers the "1-D" fax encoded signal and provides this signal to DTE 30, which, using fax application software 35, recovers document 12'. It should be noted that no modification to the equipment of the PSTN fax endpoint is required.

A more detailed block diagram is shown in FIG. 2. As described above, DTE 10 provides a "2-D" fax encoded signal via line 11 to cellular modem 100. The latter provides a modulated data signal for transmission to mobile phone 140, via line 133. As known in the art, line 133 may include an RJ11 adapter for coupling the DCE interface of cellular modem 100 to the local signaling interface of the mobile phone. The cellular transceiver (not shown) of mobile phone 140 further modulates the signal provided by cellular modem 100 onto a cellular carrier, which is transmitted to cell site transceiver 255, via impaired channel 200. Cell site transceiver 255 demodulates the received cellular signal to provide a received digital version of the modulated data signal to MSC 250 via line 256, which is typically a T1 facility.

MSC 250 includes switching system 245 and cellular modem pool 230. The latter comprises a number of pairs of back-to-back modems as represented by modem pair 225. As known in the art, switching system 245 provides the received digital version of the modulated data signal to modem pair 225 of cellular modem pool 230, via line 236. Modem pair 225 converts the "2-D" fax encoded signal provided by DTE 10 to a "1-D" fax encoded signal and provides a modulated fax signal for transmission over the PSTN portion of the cellular fax call. Modem pair 225 provides this modulated fax signal to the PSTN portion of the cellular fax call via line 241. The PSTN portion of the cellular fax call is represented by PSTN facility 341, PSTN 340, and line 311, which represents the local-loop coupling PSTN modem 300 to a local exchange carrier (not shown) included within PSTN 340. It should be noted that lines 236 and 241 have been shown as separate lines for simplicity. However, lines 236 and 241 are typically representative of allocated time slots of time-division multiplexed bus 246 that couples each modem pair of cellular modem pool 230 to switching system 245.

Each modem of modem pair 225 is known in the art as a "mu-law" modem because each modem couples directly to the above-mentioned time-division multiplexed bus as represented by lines 236 and 241. Modem pair 225 comprises cellular-side modem 235 and PSTN-side modem 240, both of which are coupled together via their DTE interfaces as represented by line 239. As described earlier, cellular-side modem 235 and cellular modem 100 terminate the cellular portion of the cellular fax call, while PSTN-side modem 240 and modem 300 terminate the PSTN portion of the cellular fax call. This allows cellular-side modem 235 and cellular modem 100 to communicate data using a cellular-oriented data protocol like AT&T Paradyne's ETC protocol, and for PSTN-side modem 240 and modem 300 to communicate data using a more traditional fax protocol like V.17.

Having described the data flow through an established cellular fax call, the fax call processing in accordance with the principles of the invention is now described. It is assumed that the cellular user initiates the fax call and desires to utilize cellular modem pool 230. An illustrative flow diagram embodying the principles of the invention is shown in FIG. 3. In step 590, fax application software 15 starts the fax call by sending a sequence of "AT-type commands" to cellular modem 100. This initial sequence of commands refers to the "setup" portion of the subsequent fax call. In accordance with the principles of the invention, cellular modem 100 buffers this setup sequence of "AT-type commands" and spoofs fax application software 15 in step 595. That is, cellular modem 100 provides the necessary responses to fax application software 15 just like a regular fax call was being initiated notwithstanding the fact that cellular modem 100 is only buffering these "AT-type commands" for latter transmission. It is assumed that an appropriate buffer is included within cellular modem 100 to provide this storage.

In step 600, the cellular user initiates a cellular fax call to the opposite PSTN fax endpoint. For example, the cellular user dials both an access code, e.g., "*FAX," and a telephone number associated with the called party, who is represented by the PSTN fax endpoint. To perform the dialing function, the cellular user enters the well-known "AT dialing command," via DTE 10, using fax application software 15. Upon receiving the above-mentioned "AT dialing command," cellular modem 100 switches into a fax mode of operation in step 605. (It should be noted that it is well-known that the type of transmission, fax or data, is communicated to a corresponding modem, or DCE, via an "AT-type command." Consequently, a cellular modem embodying the principles of this invention can transition to a fax mode of operation upon detection of FAX-specific "AT command" parameters. For example, even a pre-stored telephone number within the modem could be associated with a facsimile endpoint.) Cellular modem 100 begins the cellular fax call in step 610 by transmitting the "*FAX" and received telephone number to mobile phone 140, which sets up a cellular telephone call with switching system 245 of MSC 250.

It is assumed here that MSC 250 does not provide a transparent call progress feature that allows the cellular user to hear the call progress on the PSTN-side of the cellular fax connection. A transparent call progress feature is described in the copending, commonly assigned, U.S. patent application of Exner et al entitled "Transparent Call Progress," Ser. No. 08/380872, filed on Jan. 30, 1995. If a mobile switching center does provide a transparent call progress feature then it is assumed that the mobile switching center is appropriately modified so that a cellular user can enable or disable this feature on a per-call basis, e.g., by entering a predefined special (*) code as is known in the art, e.g., as is currently done to enable and disable call-waiting notification.

In step 615, switching system 245 detects the "*FAX" access code and switches the incoming call through cellular modem pool 230. In this context, "*FAX" is similar to "*DATA," as currently used, to alert switching system 245 to use the cellular modem pool. As known in the prior art, switching system 245 selects an idle back-to-back modem pair of cellular modem pool 230 and assigns time slots as represented by lines 236 and 241 to the selected modem pair. In this example, the selected pair of back-to-back modems is represented by modem pair 225.

Once modem pair 225 of cellular modem pool 230 is switched in, switching system 245 provides a six digit code to modem pair 225 via line 236. As known in the art, this six digit code is a reference number, e.g., a pointer, associated with the actual telephone number, which is stored within switching system 245. In addition, this six digit code is represented by the well-known "multi-frequency" (MF) signaling, i.e., each digit is represented by a different set of frequency pairs. For example, upon detecting the existence of a MF signal sequence, cellular-side modem 235 converts the MF signal sequence to a data string, which, in this example, represents the six digit code. Cellular-side modem 235 temporarily stores the six digit code in a buffer (not shown) in step 620. In step 630, cellular modem 100 provides a "fax mode handshaking signal," e.g., a tone, to cellular-side modem 235, i.e., an "extended fax calling tone." The latter indicates that the subsequent data connection will transport fax information. In step 635, cellular-side modem 235 monitors the handshaking for this "fax mode handshaking signal." If no "fax mode handshaking signal" is detected, cellular-side modem 235 switches to data mode in step 640 and, if necessary transparent call progress is enabled. However, if a "fax mode handshaking signal" is detected, cellular-side modem 235 switches to fax mode in step 645. In accordance with the invention, cellular-side modem 235 completes training in step 650 to subsequently communicate data over the cellular portion of the cellular fax call using a data modulation, e.g., the above-mentioned ETC protocol. As a result, during the subsequent "message transmission" phase of the fax call, cellular-side modem 235 receives ITU T.4 data, through ITU V.32 type data modulation, and passes this fax data along to PSTN-side modem 240, as described below. (It should be noted that if V.42bis compression is used between the modems over the cellular-portion of the connection an additional compression of the data may occur).

In step 655, cellular-side modem 235 communicates call information with PSTN-side modem 240 by passing a predefined "AT-command" sequence that includes the above-described six digit code and identifies whether the call is a fax call or a data call. In response, PSTN-side modem 240 similarly switches to a respective data mode or fax mode of operation in step 660. Also, in step 665, PSTN-side modem 240 goes "off-hook" and regenerates the MF signal sequence on line 241 to dial the called party. Upon detecting the six digit code, switching system 245 retrieves, and dials, the called party telephone number.

After completing training, cellular modem 100, in accordance with the inventive concept, sends the above-mentioned stored "AT-type commands" representing setup information to the cellular-side modem in step 667. Also, because cellular modem 100 has switched to fax mode, cellular modem subsequently passes all "AT-type commands" from DTE 10 to cellular-side modem 235 in step 670 once on-line. In this context, all FAX commands from DTE 10 are classified as remote commands and are transmitted to cellular-side modem 235 in step 670. Since DTE FAX commands are well-defined, cellular modem 100 transmits them as data directly to cellular-side modem 235 instead of operating on them. (Note, in the off-line fax mode, local "AT-commands" are operated on by the cellular modem, while remote commands are stored and transmitted to a far-end endpoint.) This allows fax-capable terminal equipment at the mobile end to communicate directly with far-end fax-capable PSTN modem 240 in the MSC. In particular, cellular-side modem 235 passes all recovered data to PSTN-side modem 240 in step 675. As a result, the cellular portion of the connection acts like an extended RS-232 cable—in other words, any PC FAX commands and data from DTE 10 act upon PSTN-side modem 240 in the MSC modem pool. Similarly, any data transmitted by PSTN modem 300 is transmitted back to DTE 10. In effect, cellular modem 100 spoofs DTE 10 that a fax transmission is taking place when actually cellular modem 100 is using a data modulation and passing through any "FAX AT commands" to cellular modem pool 230. As a result, DTE 10 negotiates the fax call with DTE 30 via PSTN-side modem 240, which completes the call connection to PSTN modem 300 as in the prior art in step 680.

Figure 4:
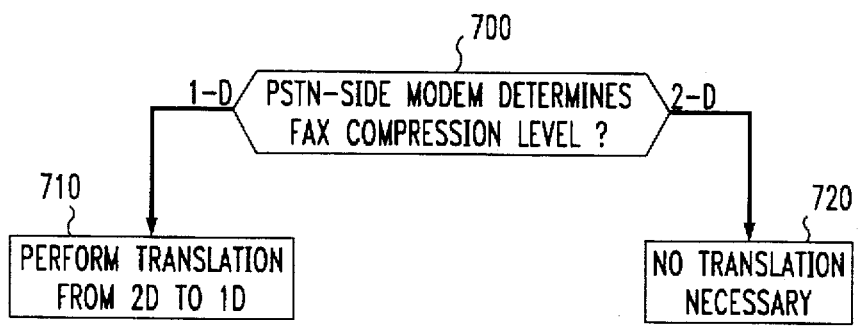
FIG. 4 shows an illustrative flow diagram for use in a PSTN-side modem of the cellular modem pool shown in FIG. 2.

In the process of establishing the fax call, PSTN-side modem 240 not only performs (as in the prior art) the fax handshaking with PSTN modem 300 but also monitors this control information to determine the type of fax encoding that is to be used. As noted above, fax application software 15 always provides "2-D" fax encoded data. Consequently, and in accordance with the principles of the invention, PSTN-side modem 240 translates the "2-D" fax encoded data into "1-D" fax encoded data if necessary. This is shown in FIG. 4, which illustrates a flow diagram for use within PSTN-side modem 240.

In step 700, PSTN-side modem 240 monitors the above-mentioned fax handshaking between DTE 10 and DTE 30 to determine the level of fax compression negotiated over the PSTN portion of the cellular fax call. If the level of fax compression is "1-D," then PSTN-side modem 240 additionally translates the T.4 encoded "2-D" data from DTE 10 to T.4 encoded "1-D" data in step 710. On the other hand, if the level of fax compression negotiated over the PSTN portion of the cellular fax call is "2-D," then PSTN modem 240 performs no translation in step 720.

It should be noted that PSTN-side modem 240 is not run-time challenged in performing the translation of step 710 since it is not doing more complex data modulations like V.42bis, V.42, etc. That is, PSTN-side modem 240 has enough run time available to do the "2-D" to "1-D" compression translation. However, even if PSTN-side modem 240 did run out of processing time, the corresponding fax transmission would simply be slowed down. Even in this latter scenario, total throughput would still probably exceed the case where no "2-D" compression was used over the cellular portion of the cellular fax call. In addition, since the cellular link is generally more impaired than the PSTN link, the cellular link, normally, will be slower—i.e., the cellular link will be the bottleneck. Consequently, the PSTN-side modem is idle, waiting for data, much of the time. For example, the PSTN-side modem can support 14,400 bps using ITU V.17, in comparison, the cellular link may typically be at 4,800 bps using ETC.

Figure 5:
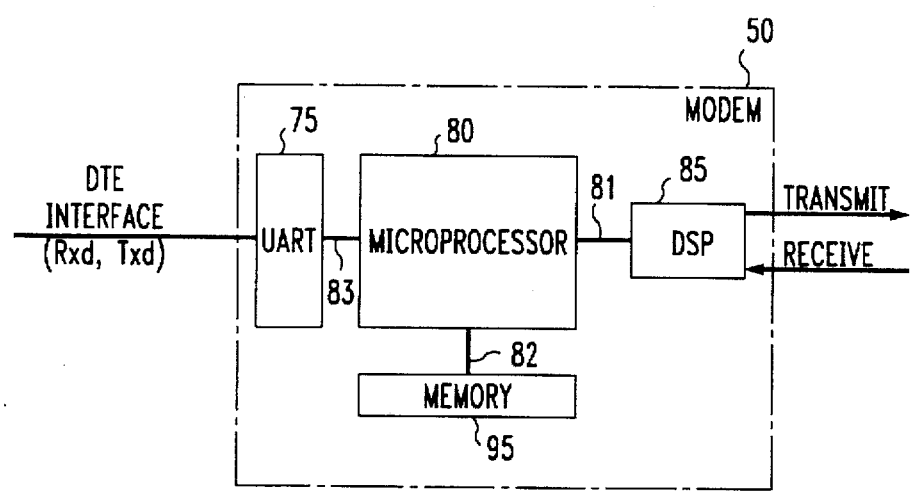
FIG. 5 shows an illustrative block diagram of a modem for use in the cellular communications system of FIG. 2.
Figure 6:
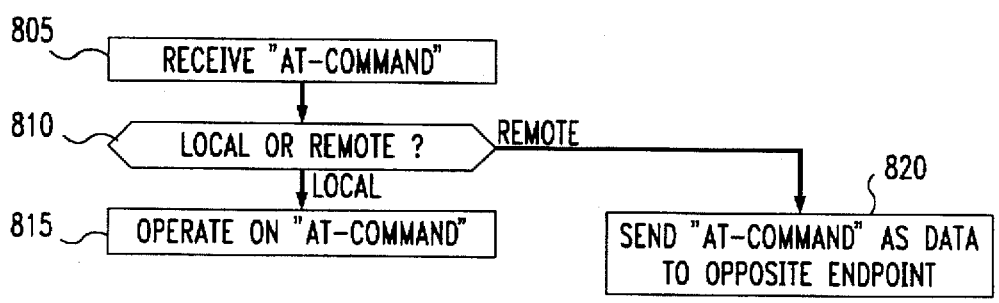
FIG. 6 shows an illustrative flow diagram in accordance with the principles of the invention for use in a cellular modem.

FIG. 5 shows an illustrative high-level block diagram of a modem in accordance with the principles of the invention. In particular, modem 50 includes a microprocessor 80, memory 95, a digital signal processor 85, e.g., for providing the tone generator/detector and other modem functions mentioned above, and universal/asynchronous receive transmit (UART) 75 for providing the DTE interface. Microprocessor 80 is coupled to DSP 85 via line 81, which represents, address, data, control, and status leads. In the contexts of this invention, it is assumed that the above-described flow charts of FIGS. 3 and 4 are implemented in software. For example, the portions of the flow chart of FIG. 4 is a part of the program stored in memory 95 and executed by microprocessor 80 when FIG. 5 represents cellular modem 100. For illustration, these portions of the flow chart referred to, and described earlier, are shown again in FIG. 6.

As can be observed from the above description, a fax call comprises a setup (off-line) portion and an on-line portion, during which sequences of "AT-type commands" are passed to the respective data communications equipment. As described above, it is necessary for cellular-modem 100 to both buffer the off-line "AT-type commands" and spoof the respective fax application software that a fax call is progressing. However, an alternative implementation of the inventive concept is possible if a change is made to fax application software 15 such that fax application software 15 can be configured to an "extended fax mode of operation."

Figure 7:
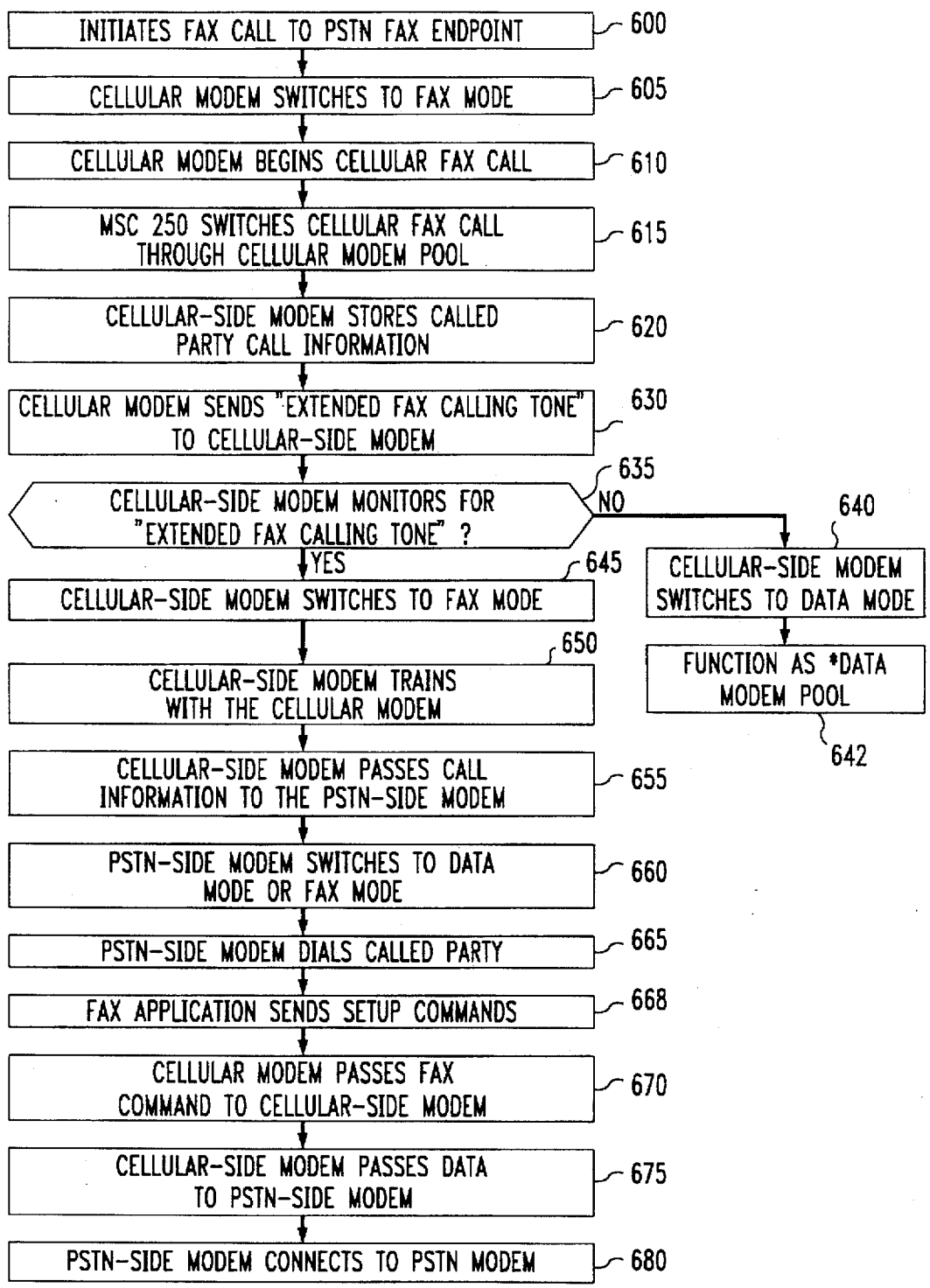
FIG. 7 shows another illustrative flow diagram for processing a fax call in accordance with the principles of the invention.

The latter is accomplished by allowing a user to configure fax application software 15 in a similar fashion to setting other data communications equipment options. Once fax application software 15 is configured for an "extended fax mode of operation," the flow chart of FIG. 3 is simplified to that shown in FIG. 7. The latter is identical to FIG. 3 except for the deletion of steps 590, 595, and 667, and the addition of step 668. In this "extended fax mode of operation," the fax call setup sequence is changed. In particular, fax application software 15 first establishes the fax connection and then transmits the above-mentioned off-line "AT-type commands" to cellular modem 100. As a result, steps 590 and 595 have been deleted and cellular modem 100 does not have to buffer the off-line "AT-type commands." Similarly, step 667 has been deleted and replaced by step 668, where the respective DTE equipment now sends the off-line "AT-type commands" after the call is setup. This modification removes any additional buffering and the requirement for cellular modem 100 to spoof fax application software 15 during a portion of the fax call.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the inventive concept was illustrated in the context of a personal computer and a distinct cellular modem, it should be realized that these can be integrated into one physical arrangement for the sending and receiving of faxes in accordance with the principles of the invention. Similarly, although described in the context of an additional compression feature, it should be realized that this is not required to provide an extended fax mode of operation. Also, although described in the context of a data mode and a fax mode, it should be realized that the local and remote modes of operation can be user-definable. For example, a local mode of operation can be associated with both a data mode and a standard fax mode in which data and fax calls, respectively, are completed as in the prior art. However, in the remote mode of operation all FAX commands are transmitted to an opposite endpoint. In this context, the modem can be switched into the remote mode by, e.g., a suitably defined "AT-type" command issued by a user via the associated data terminal equipment.

What is claimed:

1. A method for use in data communications equipment operating on the analog cellular network, the method comprising the steps of;
   receiving through a data terminal equipment port of the data communications equipment a data signal representing a predefined modem command;
   classifying the predefined modem command as a local command or a remote command;
   if a local command, operating on the predefined modem command; and
   if a remote command, transmitting the predefined modem command, in a data modulation format containing facsimile information to a remote facsimile modem, said remote facsimile modem being a PSTN-side facsimile modem of a back-to-back modem pair at a mobile switching center in the analog cellular network.

2. The method of claim 1 wherein the predefined modem command is an "AT-compatible" command.

3. The method of claim 1 wherein the step of classifying includes the steps of:
   identifying the predefined modem command as remote if the predefined modem command is associated with a facsimile operation; and
   identifying the predefined modem command as local if the predefined modem command is associated with a non-facsimile operation.

4. A method for establishing a facsimile telephone call over the analog cellular network to an opposite endpoint, the method comprising the steps of:
   detecting in a modem a start of the facsimile telephone call;
   switching to an extended mode of operation; classifying subsequently received "AT-compatible" commands as local or remote;
   operating on those subsequently received "AT-compatible" commands classified as local; and
   transmitting, in a data modulation format, those subsequently received "AT-compatible" commands classified as remote, said commands containing facsimile information, to a far-end modem, said far-end modem being a PSTN-side facsimile modem of a back-to-back modem pair at a mobile switching center in the analog cellular network.

5. The method of claim 4 wherein the classifying step identifies those subsequently received "AT-compatible" commands associated with a facsimile operation as remote and any other subsequently received "AT-compatible" command as local.

6. Data communications equipment apparatus comprising:
   a data terminal equipment port for receiving signals representative of a sequence of modem commands; and
   a processor for classifying each modem command of the sequence into either a local command or a remote command and for operating on those modem commands of the sequence that are local and for communicating those modem commands of the sequence that are remote, in a data modulation format containing facsimile information, over the analog cellular network to a remote far-end facsimile modem, said far-end facsimile modem being a PSTN-side facsimile modem of a back-to-back modem pair at a mobile switching center in the analog cellular network.

7. The apparatus of claim 6 wherein those modem commands of the sequence classified as remote are associated with facsimile transmission and those modem commands of the sequence that are classified as local are associated with data transmission.

8. Data communications equipment apparatus comprising:
   means for receiving a data signal representing a predefined modem command;
   means for classifying the predefined modem command as a local command or a remote command; means for operating on the modem command if classified as local; and
   means for transmitting, in a data modulation format, the modem command if classified as remote to a remote facsimile modem, said command containing facsimile information, said remote facsimile modem being a PSTN-side facsimile modem of a back-to-back modem pair at a mobile switching center in the analog cellular network.

9. The apparatus of claim 8 wherein said classifying means is configured so that the predefined modem command is classified as a remote command if associated with facsimile transmission and as a local command if associated with data transmission.

* * * * *